(12) United States Patent
Warfield et al.

(10) Patent No.: US 12,292,818 B2
(45) Date of Patent: May 6, 2025

(54) SYSTEM AND METHOD FOR GENERATING SYNTHETIC TEST DATA

(71) Applicant: Cognizant Technology Solutions US Corp., Teaneck, NJ (US)

(72) Inventors: Lisa Kay Warfield, Hampton, VA (US); Amanda Jean Dussault, Wake Forrest, NC (US)

(73) Assignee: COGNIZANT TECHNOLOGY SOLUTIONS US CORP., Teaneck, NJ (US)

(*) Notice: Subject to any disclaimer, the term of this patent is extended or adjusted under 35 U.S.C. 154(b) by 450 days.

(21) Appl. No.: 17/592,560

(22) Filed: Feb. 4, 2022

(65) Prior Publication Data

US 2023/0251959 A1    Aug. 10, 2023

(51) Int. Cl.
*G06F 11/3668*    (2025.01)

(52) U.S. Cl.
CPC ........ *G06F 11/3684* (2013.01); *G06F 11/368* (2013.01); *G06F 11/3688* (2013.01); *G06F 11/3692* (2013.01)

(58) Field of Classification Search
CPC .............. G06F 11/3684; G06F 11/368; G06F 11/3688; G06F 11/3692
See application file for complete search history.

(56) References Cited

U.S. PATENT DOCUMENTS

| | | | |
|---|---|---|---|
| 6,577,982 B1 * | 6/2003 | Erb | G06F 11/3684 702/120 |
| 7,716,069 B2 * | 5/2010 | Ulrich | G06Q 40/08 705/2 |
| 7,747,453 B2 * | 6/2010 | Ulrich | G16H 20/00 705/2 |
| 8,438,238 B2 | 5/2013 | Moser | |

(Continued)

FOREIGN PATENT DOCUMENTS

WO    WO-2023015287 A1 *    2/2023

OTHER PUBLICATIONS

Tucker, Allan, et al. "Generating high-fidelity synthetic patient data for assessing machine learning healthcare software." NPJ digital medicine 3.1 (2020): 147. (Year: 2020).*

*Primary Examiner* — Matthew J Brophy
(74) *Attorney, Agent, or Firm* — CANTOR COLBURN LLP

(57) ABSTRACT

The present invention provides for generating in real-time synthetic test data comprising large volumes of data records associated with an entity for testing data processing applications. In operation, the present invention provides for generating a data structure, where the data structure is populated with predefined segments based on selected operating field. Each predefined segment comprises one or more sub-segments. The data values for each sub-segment is generated based on one or more parameters. Further, the present invention provides for evaluating combinations between data values of one or more sub-segments of one or (Continued)

more predefined segments. Yet further, synthetic test data comprising a plurality of data records is generated based on generated data structure and evaluated combinations, where each data record is populated with one or more sub-segments of the data structure, arranged within each data record and populated with data values based on the one or more parameters.

28 Claims, 4 Drawing Sheets

(56) References Cited

U.S. PATENT DOCUMENTS

| | | | |
|---|---|---|---|
| 8,612,259 B2 | 12/2013 | Menschik | |
| 8,649,995 B2* | 2/2014 | Thulasidasan | G06F 11/3684 |
| | | | 702/123 |
| 8,990,198 B2* | 3/2015 | Rolls | G06F 16/212 |
| | | | 707/610 |
| 10,241,903 B1* | 3/2019 | Mody | G06F 16/24575 |
| 10,795,807 B2* | 10/2020 | Mody | G06F 16/24575 |
| 10,860,466 B1* | 12/2020 | Baldwin | G06F 11/3688 |
| 11,030,081 B2* | 6/2021 | Englehart | G06F 11/3684 |
| 11,681,610 B2* | 6/2023 | Chang | G06F 11/3688 |
| | | | 714/26 |
| 11,748,241 B2* | 9/2023 | Martin | G06F 11/302 |
| | | | 717/124 |
| 11,954,461 B2* | 4/2024 | Briggs | G06F 8/41 |
| 2004/0107213 A1* | 6/2004 | Zubeldia | G06F 11/3684 |
| 2005/0144529 A1* | 6/2005 | Gotz | G06F 11/3684 |
| | | | 714/38.1 |
| 2006/0010426 A1* | 1/2006 | Lewis | G06F 11/3684 |
| | | | 717/124 |
| 2006/0100905 A1 | 5/2006 | Christen | |
| 2007/0061393 A1* | 3/2007 | Moore | H04L 67/02 |
| | | | 709/201 |
| 2011/0047628 A1* | 2/2011 | Viars | G16H 10/60 |
| | | | 726/28 |
| 2012/0259576 A1* | 10/2012 | Thulasidasan | G06F 11/3684 |
| | | | 702/123 |
| 2012/0324414 A1* | 12/2012 | Tzoref-Brill | G01R 31/318371 |
| | | | 716/136 |
| 2013/0006683 A1* | 1/2013 | Rao | G06Q 10/06 |
| | | | 705/7.11 |
| 2013/0291060 A1* | 10/2013 | Moore | G06F 21/6254 |
| | | | 726/1 |
| 2014/0278479 A1 | 9/2014 | Wang | |
| 2015/0242585 A1* | 8/2015 | Spiegel | G16H 10/60 |
| | | | 705/2 |
| 2016/0092347 A1* | 3/2016 | Edwards | G06F 11/3698 |
| | | | 717/125 |
| 2017/0024311 A1* | 1/2017 | Andrejko | G06F 11/3698 |
| 2018/0218120 A1* | 8/2018 | Canzoneri | G16H 10/60 |
| 2019/0171555 A1* | 6/2019 | Mody | G06F 11/3688 |
| 2020/0379885 A1* | 12/2020 | Englehart | G06F 11/3684 |
| 2020/0401503 A1* | 12/2020 | Gao | G06F 11/3698 |
| 2021/0357316 A1* | 11/2021 | Chang | G06N 20/00 |
| 2021/0391045 A1* | 12/2021 | Hallemeier | G16H 40/20 |
| 2022/0188219 A1* | 6/2022 | Hicks | G06F 11/3692 |
| 2022/0229768 A1* | 7/2022 | Martin | G06F 11/302 |
| 2023/0118407 A1* | 4/2023 | Ramanjani | G06F 18/214 |
| | | | 717/124 |

* cited by examiner

```
FILE    EDIT    VIEW    HELP
```

- COMMERCIAL
  - [+] MEMBER LEVEL
  - [−] DEMOGRAPHIC LEVEL
    - ☐ 1. MEMBER NAME
    - ☐ 2. INCORRECT MEMBER NAME
    - ☐ 3. MAILING ADDRESS
    - ☐ 4. EMPLOYER ADDRESS
    - ☐ 5. SCHOOL ADDRESS
    - ☐ 6. CUSTODIAL PARENT
    - ☐ 7. RESPONSIBLE PERSON
    - ☐ 8. DROP OFF LOCATION
  - [−] COVERAGE DETAILS
    - ☐ 1. DISABILITY INFO
    - ☐ 2. HEALTH COVERAGE
    - ☐ 3. PROVIDER INFO
    - ☐ 4. COB
    - ☐ 5. COB RELATED ENTITY

FIGURE 1A

SYSTEM AND METHOD FOR GENERATING SYNTHETIC TEST DATA

FIELD OF THE INVENTION

The present invention relates generally to the field of software development and testing. More particularly, the present invention relates to a system and a method for generating in real-time synthetic data comprising large volumes of data records for testing data processing software tools, in particular healthcare data processing tools.

BACKGROUND OF THE INVENTION

With advancement of technology, the use of software applications for processing data associated with healthcare has increased rapidly. Generally, software applications used in the field of healthcare are configured to at least record, maintain and process data associated with members/patients, service providers, third party payer services, and the like, for activities including, but not limited to, enrollment of members for a service or a healthcare insurance plan, billing, insurance claim assessment and processing, and transactions including payments etc. The third party payer services referred to herein may include, but are not limited to, health care insurance companies or health care payers. Further, a service provider may include, but is not limited to, any person, such as a doctor, pharmacist, etc., or an institution, such as a hospital, clinic, or medical equipment provider.

The healthcare specific software applications require testing during various stages of development and post-development similar to any other data processing software application to determine if different features and/or configurations within the application are performing as expected. For example, a third party payer service, such as a healthcare payer may deploy a software application including features, such as database management for enrollment of members. As the Healthcare Payers unique business needs constantly change, the software application prior to deployment requires large volumes of test cases with many variations of test data and unique scenarios to ensure that there is no gap in the test-case coverage and the software works as expected. As a result, the required test data should include member data records with variables and volume to confidently validate the features of the software application to avoid rework or re-adjudication by quickly identifying defects in the features. However, unlike any other data processing application, the test data required for testing many of the healthcare specific applications should be realistic, voluminous and free from protected health information (PHI). As a result, the production data from a source cannot be used directly by the testing teams for application testing due to confidentiality concerns. Moreover, the task of importing large volumes of data can be cumbersome and often requires high processing as wells as interfacing speeds.

In order to overcome the above problems, the test data required for testing healthcare applications that require data records associated with one or more entities is often generated manually or through complex manipulation of production data from existing sources. However, manual creation and assembling of large volumes of data is time consuming. Further, the process of creating large volumes of data manually often leads to modifications in the data, resulting in creation of unusable data. Additionally, if the data from an existing source is manipulated to create new data, the new data is often not masked resulting in a security risk.

In light of the above drawbacks, there is a need for a system and a method that can generate synthetic test data in real-time for testing data processing applications. In particular, there is a need for a system and a method that can generate synthetic test data comprising a plurality of data records associated with an entity, such as a member/patient for testing healthcare data processing applications. Further, there is a need for a system and a method that can generate healthcare test data comprising large volumes of realistic synthetic data records encompassing various attributes of the entity without using confidential data, such as Protected Health Information (PHI). Furthermore, there is a need for a system and a method that can generate optimized combinations between various attribute values with positive and negative test data combinations to complete test cases and improve test-case coverage. Yet further, there is a need for a system and a method that can generate on-demand, versatile, scalable, and secure synthetic data agnostic to healthcare applications. Yet further, there is a need for a system and a method that significantly reduces the time required for generation of test data. Yet further, there is a need for a system and a method, which is economical, secure and relatively accurate.

SUMMARY OF THE INVENTION

In accordance with various embodiments of the present invention, a method for generating synthetic test data is provided. The method is implemented by a processor executing program instructions stored in a memory. The method comprises generating a data structure, where the data structure is populated with one or more predefined segments based on a selected operating field, each of the one or more predefined segments further comprising one or more customizable sub-segments. The method further comprises, evaluating most probable and optimized combinations between the one or more customizable sub-segments of the one or more predefined segments. Further, the method comprises generating synthetic test data comprising a plurality of data records based on the generated data structure and the evaluated combinations. Each of the plurality of data records are populated with the one or more customizable sub-segments of the data structure, where the one or more customizable sub-segments are arranged within each of the plurality of data records and populated with data values based on one or more parameters associated with said one or more customizable sub-segments.

In accordance with various embodiments of the present invention, a system for generating synthetic test data is provided. The system comprises a memory storing program instructions, a processor configured to execute program instructions stored in the memory, and a synthetic data generation engine executed by the processor. The system is configured to generate a data structure, where the data structure is populated with one or more predefined segments based on a selected operating field, each of the one or more predefined segments further comprise one or more customizable sub-segments. Further, the system is configured to evaluate most probable and optimized combinations between the one or more customizable sub-segments of the one or more predefined segments. Yet further, the system is configured to generate synthetic test data comprising a plurality of data records based on the generated data structure and the evaluated combinations. Each of the plurality of data records are populated with the one or more customizable sub-segments of the data structure, where the one or of the plurality of data records and populated with data values based on one or more parameters associated with said one or more customizable sub-segments.

In accordance with various embodiments of the present invention, a computer program product is provided. The computer program product comprises a non-transitory computer-readable medium having computer-readable program code stored thereon, the computer-readable program code comprising instructions that, when executed by a processor, cause the processor to generate a data structure, where the data structure is populated with one or more predefined segments based on a selected operating field, each of the one or more predefined segments further comprise one or more customizable sub-segments. Further, most probable and optimized combinations between the one or more customizable sub-segments of the one or more predefined segments are evaluated. Yet further synthetic test data comprising a plurality of data records is generated based on the generated data structure and the evaluated combinations. Each of the plurality of data records are populated with the one or more customizable sub-segments of the data structure, where the one or more customizable sub-segments are arranged within each of the plurality of data records and populated with data values based on one or more parameters associated with said one or more customizable sub-segments.

BRIEF DESCRIPTION OF THE ACCOMPANYING DRAWINGS

The present invention is described by way of embodiments illustrated in the accompanying drawings wherein:

FIG. 1A is a graphical representation of tree data structure comprising segments and sub-segments associated with healthcare insurance, in accordance with an embodiment of the present invention;

DETAILED DESCRIPTION OF THE INVENTION

Figure 1:
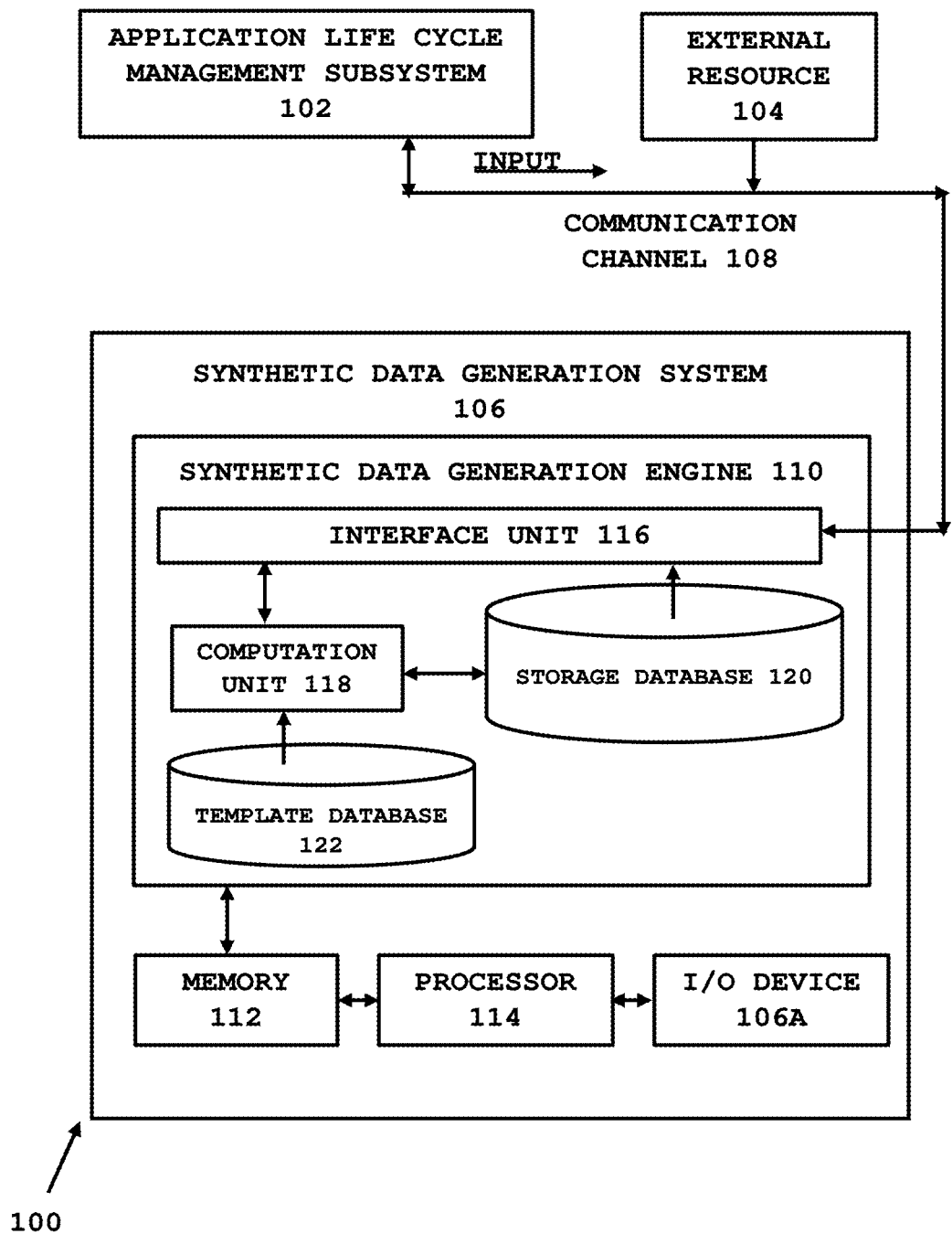
FIG. 1 is a block diagram of a testing environment including a system for generating synthetic executable test data, in accordance with various embodiments of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term "healthcare specific software applications" as used in the specification refers to any software application intended to store and process data records associated with patients/members, service providers, and payers. It is to be understood, that although the invention is described by way of embodiments exemplifying healthcare data processing application, however, the scope of the invention is not limited to healthcare data processing applications, and may be readily extended to other fields, such as banking, ticketing, transportation or any other field requiring large volumes of data records. The term "third party payer services" as used in the specification refers to health care insurance companies or health care payers. The term "service provider" as used in the specification refers to any person, such as a doctor, pharmacist, etc., or an institution, such as a hospital, clinic, or medical equipment provider. The term "operating field" associated with the data processing applications as used in the specification refers to line of business of the application.

The present invention discloses a system and a method for generating synthetic test data in real-time for testing data processing applications. In particular, the present invention provides a system and a method that can automatically generate synthetic test data comprising large volumes of data records associated with an entity, such as a member/patient for testing data processing applications associated with one or more operating fields, such as, but not limited to, healthcare. In operation, the present invention provides for generating a data structure associated with an operating field of test data or the data processing application, wherein the data structure is populated with one or more predefined configurable segments based on a selection of the operating field. The segments are representative of test data fields required in data records associated with the entity for the selected operating field. Each of the one or more segments of the data structure further comprise one or more customizable sub-segments. The one or more sub-segments are representative of attributes of the corresponding predefined segments. The present invention further provides for generating realistic data values for each of the sub-segments based on one or more predefined parameters and/or user-customizable parameters. The one or more predefined parameters comprise, but are not limited to, POS, sub-segment ID, name, usage, repetition, max repetition, syntax, ID, and loop. The present invention further provides for defining user-customizable parameters including, but not limited to, data type, mandatory, minimum size, maximum size, can be duplicate, can be identical, specific pattern of the attribute etc. Further, the present invention provides for generating synthetic test data comprising a plurality of data records associated with an entity based on the generated data structure, and evaluation of most probable and optimized combinations between the one or more sub-segments of the one or more predefined segments. Each data record is populated with one or more sub-segments of the data structure, where the one or more sub-segments are arranged within each data record and populated with data values based on the one or more parameters. Yet further, the present invention provides for linking one or more data records with other data records based on a selection of relationship.

The present invention would now be discussed in context of embodiments as illustrated in the accompanying drawings.

Referring to FIG. 1 a block diagram of a testing environment including a system for generating synthetic executable test data is illustrated. In an embodiment of the present invention the testing environment 100 includes an Application Lifecycle Management (ALM) subsystem 102, external resources 104, and a system for generating synthetic executable test data, herein after referred to as synthetic data generation system 106.

In accordance with various embodiments of the present invention, the Application Lifecycle Management (ALM) subsystem 102 is a tool configured to manage the lifecycle of any application from project planning, requirement gathering, until Testing and deployment. In an embodiment of the present invention ALM subsystem 102 may be a software, or a combination of software and hardware. In an embodiment of the present invention as shown in FIG. 1, the ALM subsystem 102 is a combination of software and hardware. In another embodiment of the present invention, the ALM subsystem 102 is a software tool executable via one or more client-computing devices (not shown). Examples of a client-computing device may include, but are not limited to, a general purpose computer such as a desktop, a laptop; a super computer; a microcomputer or any device capable of executing instructions, connecting to a network and sending/receiving large volumes of data. In an embodiment of the present invention, the ALM subsystem 102 is integrated with a source code management functionality to store the source code of the application. In another embodiment of the present invention the ALM subsystem 102 is configured to interface with a code repository (not shown), such as Github to retrieve the source code of an application for managing, testing and deployment. In an embodiment of the present invention, the ALM subsystem 102 is implemented for developing, managing, testing and deploying a healthcare data processing application for a third-party payer service, such as an insurance service. In an exemplary embodiment of the present invention, the third-party payer service is a "healthcare payer". In an embodiment of the present invention, the ALM subsystem 102 may be deployed locally or remotely by the healthcare payer for development and testing of healthcare application. It is to be understood that the ALM subsystem 102, as described in the specification is for exemplary purposes only, and the ALM subsystem 102 does not limit the scope of the present invention in anyway.

In an embodiment of the present invention, ALM subsystem 102 is configured to test the one or more features of a healthcare data processing application. In an exemplary embodiment of the present invention, the healthcare data processing application may comprise features, including, but not limited to, member enrollment, eligibility and benefit verification, and member inquiries. In an embodiment of the present invention, the ALM subsystem 102 is configured to test the one or more features of the healthcare data processing application by generating test cases based on synthetic test data generated by the synthetic data generation system 106. For example: The payer may enroll a plurality of members as per different healthcare plans, and the payer may pay for healthcare services received by an insured member, such as a patient and its dependent, from a service provider including, but not limited to, any person, such as a doctor, pharmacist, etc., or an institution, such as a hospital, clinic, or medical equipment provider. Therefore, the healthcare data processing application is to be tested for member enrollment in order to ensure proper working of the healthcare application at the time of member enrolment.

In an embodiment of the present invention, the ALM subsystem 102 is configured to interface with the synthetic data generation system 106 in order to generate test data. In an embodiment of the present invention, the ALM subsystem 102 interfaces with the synthetic data generation system 106 via a communication channel 108. Examples of the communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). In an embodiment of the present invention, the test data is associated with an operating field of the healthcare data processing application. In an exemplary embodiment of the present invention, the test data is healthcare test data comprising a plurality of data records associated with the members/patients.

In an embodiment of the present invention, the external resource 104 includes third party systems, such as computing resources, databases, software management tools, testing platforms, etc. In an exemplary embodiment of the present invention, the external resource 104 is a storage database. In accordance with various embodiments of the present invention, the external resource 104 interfaces with the synthetic data generation system 106 via the communication channel 108 to backup data and generated records.

In accordance with various embodiments of the present invention, the synthetic data generation system 106 may be a software executable by a computing device or a combination of software and hardware. In an embodiment of the present invention as shown in FIG. 1, the synthetic data generation system 106 is a combination of a software and a hardware. In an embodiment of the present invention, the synthetic data generation system 106 may be implemented as a client-server architecture, wherein a client-computing device and/or an ALM subsystem 102 accesses a server hosting the synthetic data generation system 106 over the communication channel 108. In an exemplary embodiment of the present invention, the functionalities of the synthetic data generation system 106 are delivered as Software as a Service (SAAS) to one or more client-computing devices and/or ALM subsystems 102. In another embodiment of the present invention, the synthetic data generation system 106 may be implemented in a cloud computing architecture in which data, applications, services, and other resources are stored and delivered through shared data-centers. In an exemplary embodiment of the present invention, the synthetic data generation system 106 is a remote resource implemented over the cloud and accessible for shared usage in a distributed computing architecture by various ALM subsystem 102 and/or client-computing devices. In an exemplary embodiment of the present invention, the synthetic data generation system 106 may be accessed via an IP address/domain name. In another exemplary embodiment of the present invention, the synthetic data generation system 106 may be accessed via a user module of the synthetic data generation system 106 executable on the ALM subsystem 102.

In another embodiment of the present invention, the synthetic data generation system 106 is a software configured to be integrated with the ALM subsystem 102. In another embodiment of the present invention, the synthetic data generation system 106 is a software installable and executable by any client-computing device. In an embodiment of the present invention, the ALM subsystem 102 is configured with a Graphical User Interface (GUI) of the synthetic data generation system 106 to at least select an operating field associated with the test data, configure segments and sub-segments, receive test data, modify test data, select file format, and receive graphic visualization of the data records among other things.

In accordance with various embodiments of the present invention, the synthetic data generation system 106 is configured to interface with the ALM subsystem 102, and the external resource 104. In an embodiment of the present invention, the synthetic data generation system 106 is configured to interface with the ALM subsystem 102 to receive at least the test data generation requests. In an embodiment of the present invention, the synthetic data generation system 106 is configured to interface with the external resource 104 to back up generated test data or any other data.

In an embodiment of the present invention, the synthetic data generation system 106 comprises an Input/output (I/O) device 106A, a synthetic data generation engine 110, a memory 112, and a processor 114. The synthetic data generation engine 110 is operated via the processor 114 specifically programmed to execute instructions stored in the memory 112 for executing functionalities of the synthetic data generation engine 110 in accordance with various embodiments of the present invention. In accordance with various embodiments of the present invention, the memory 112 may be a Random Access Memory (RAM), a Read Only Memory (ROM), a hard drive disk (HDD), a Solid-state drive (SDD) or any other memory capable of storing data and instructions. In an embodiment of the present invention, the I/O device 106A may be a touch screen device, a key board, a pointer device, a track pad, a display unit, or any other device capable of receiving inputs and outputting results.

In accordance with various embodiments of the present invention, the synthetic data generation engine 110 is an automated engine configured to generate a data structure associated with a selected operating field of a data processing application, configure segments and sub-segments of the data structure required for test data, generate realistic values of the sub-segments, evaluate combinations between the sub-segments, and generate test data comprising a plurality of data records using the generated values and evaluated combinations.

In accordance with various embodiments of the present invention, the synthetic data generation engine 110 comprises an interface unit 116, a computation unit 118, a storage database 120, and a template database 122. The various units of the synthetic data generation engine 110 are operated via the processor 114 specifically programmed to execute instructions stored in the memory 112 for executing respective functionalities of the multiple units (116,118,120 and 122) in accordance with various embodiments of the present invention.

In accordance with various embodiments of the present invention, the interface unit 116 is configured to facilitate communication with the ALM subsystem 102 and the external resources 104. In an embodiment of the present invention, the interface unit 116 is configured to provide communication with the I/O device 106A associated with the synthetic data generation system 106 for updating system configuration, receiving inputs from a user and outputting results.

In an embodiment of the present invention, the interface unit 116 may be configured with any of the following: a web gateway, a mobile gateway, a Graphical User Interface (GUI), an integration interface, an administrator interface and combinations thereof, to facilitate integration and/or interfacing with the ALM subsystem 102, the external resource 104 and I/O device 106A. In an exemplary embodiment of the present invention, the integration interface is configured with one or more APIs such as REST and SOAP APIs to facilitate smooth interfacing and/or integration with the ALM subsystem 102 and the external resource 104. In an exemplary embodiment of the present invention, the administrator interface provides communication with the Input/output device 106A for receiving administration configuration from system admins.

In an embodiment of the present invention, the GUI is accessible on the ALM subsystem 102 and/or the I/O device 106A to facilitate user interaction. In an exemplary embodiment of the present invention, the Graphical User Interface (GUI) allows a user to select an operating field of the data processing application, create data structures associated with the operating field, configure predefined segments and sub-segments associated with the data structure, add/remove sub-segments, and receive test data comprising a plurality of data records amongst other things. In an embodiment of the present invention, the graphical user interface (GUI) associated with the interface unit 116 may be accessed from the ALM subsystem 102 through a web gateway. In another embodiment of the present invention, the GUI associated with the interface unit 116 may be accessed by the mobile gateway using a user module installable on the ALM subsystem 102 or a computing device (not shown) executing the ALM. In an embodiment of the present invention, where the synthetic data generation system 106 is a software installable and executable by any client-computing device (not shown), the GUI along with other units are locally accessible on the client-computing device (not shown).

In accordance with various embodiments of the present invention, the interface unit 116 is configured to receive a test data generation request from the ALM subsystem 102. In an embodiment of the present invention, the received test data generation request includes, at least the operating field of the data processing application and/or the operating field of the required test data, a file type, and a practice area, also referred to as Line of Business (LOB) associated with the operating field. Examples of operating field include, but are not limited to, healthcare insurance, banking, consumer data analytics, and employee management etc. In an exemplary embodiment of the present invention, where the operating field is healthcare insurance, the file type may include, but is not limited to 834. In an exemplary embodiment of the present invention, the Line of Business (LOB) may be selected from, but is not limited to, Medicaid, Medicare, Dental, Vision, Commercial and Behavioral Health.

In accordance with various embodiments of the present invention, the computation unit 118 is configured to receive the test data generation request from the interface unit 116. In accordance with various embodiments of the present invention, the computation unit 118 is configured to generate synthetic test data comprising a plurality of realistic data records associated with an entity based on the test data generation request. In particular, the computation unit 118 is configured to generate synthetic test data comprising a plurality of data records based on the operating field associated with the data processing application. In operation, the computation unit 118 is configured to generate a data structure associated with the operating field of the data processing application. In an exemplary embodiment of the present invention, the operating field of the data processing application is healthcare insurance. In an embodiment of the present invention, the data structure is a tree data structure. In accordance with various embodiments of the present invention, the computation unit 118 is configured to populate the data structure with one or more predefined configurable segments based on a selection of the operating field.

In an embodiment of the present invention, the one or more predefined segments are representative of test data fields required in data records associated with an entity for the selected operating field. In operation, the one or more predefined segments are populated based on the selected operating field using a mapping table comprising one or more predefined segments mapped with respective operating fields. In an exemplary embodiment of the present invention, the mapping table is maintained in the template database 122. In another embodiment of the present invention, the one or more predefined segments are populated based on the operating field using machine learning or data analytics information associated with pre-generated data records of the operating field. In an exemplary embodiment of the present invention, where the operating field of the data processing application is healthcare insurance, the requested test data is representative of a plurality of data records associated with the entity, such as a member of the healthcare payer/insurer, and the one or more predefined configurable segments include, but are not limited to, member details specific to a healthcare Payer/Insurer, demographic details of the member, and the coverage details of the member. In an embodiment of the present invention, the computation unit 118 is configured to define a predetermined repetition value representative of the number of times a segment is required in a data record. In an embodiment of the present invention, the computation unit 118 is configured to provide modification, addition and removal of the predefined segments.

In accordance with various embodiments of the present invention, each of the one or more segments of the data structure comprise one or more customizable sub-segments selected based on the practice area also referred to as Line of Business (LOB) associated with the operating field. The one or more sub-segments are representative of attributes of the corresponding segments. In an exemplary embodiment of the present invention, where the operating field of the data processing application is healthcare insurance, the member detail segment comprises sub-segments specific to a payer, including, but not limited to, subscriber identifier, policy number, supplemental identifier, member level dates etc. The demographic segment comprises sub-segments including, but not limited to, member name, Date of Birth (DOB), Gender, address, language, responsible person details, employer, school, custodial parent etc. The coverage detail segment comprises sub-segment attributing health insurance arrangement, such as, but not limited to, Health coverage, plan, disability information, cost, provider information, Coordination of Benefits (COB) and details of the care for a member. In an embodiment of the present invention, the computation unit 118 is configured to provide modification, addition and removal of the sub-segments as per the user requirement.

In accordance with various embodiments of the present invention, the computation unit is configured to generate a graphical representation of the generated data structure along with the segments and sub-segments via the interface unit 116 on the I/O device 106A and/or the ALM subsystem 102 and/or the client computing device (not shown). A graphical representation of tree data structure comprising segments and sub-segments associated with healthcare insurance are shown in FIG. 1A. As shown, in FIG. 1A, the graphical representation comprises a folder for practice area\LOB "commercial" further partitioned into sub-folder representative of segments "Member Level", "Demographic Level" and "Coverage Details". Each of the segments sub-folders are further segmented into sub-segments.

In accordance with various embodiments of the present invention, the computational unit 118 is configured to populate data values for each of the one or more sub-segments based on one or more parameters. The one or more parameters define characteristics of respective sub-segments for representation on a data record. In operation, the computational unit 118 is configured to setup one or more parameters associated with each of the one or more sub-segments. In accordance with various embodiments of the present invention, the one or more parameters are predefined and/or user-customizable. In an embodiment of the present invention, the one or more predefined parameters include, but are not limited to, Position of the Sub-Segment (POS), sub-segment ID, name of the sub-segment, usage, repetition, max repetition, syntax, ID, and loop. The parameter Position of the Sub-Segment (POS) is representative of position of the sub-segment within a selected file format of data record, such as 834. The parameter sub-segment ID is indicative of an identifier of the sub-segment. The parameter usage defines if the sub-segment is required or situational, where required is indicative of a mandatory sub-segment and situational is indicative of an optional sub-segment. The parameter repetition defines the number of times the sub-segment may be repeated. The parameter max repetition is indicative of the maximum number of repetitions allowed for the sub-segment. The parameter syntax defines the representation format of the sub-segment. For instance, for a sub-segment "address" the syntax may include codes for representing address in the form (Address Lines, City, Country, Zipcode, and State). In another example, a sub-segment "member date of birth" may be allocated a syntax dd\mm\yy or mm\dd\yy etc. In an exemplary embodiment of the present invention, the parameter loop defines the number of times a segment and its associated sub-segments may be repeated. In an embodiment of the present invention, the one or more predefined parameters are selected based on user selection from a list of predefined parameters via the ALM subsystem 102 or the I/O device 106A. In an embodiment of the present invention, the computation unit 118 is configured to perform a check to determine if the one or more parameters associated with a sub-segment are predefined. Subsequently, the values of the one or more predefined parameters are populated based on a user selection via the ALM subsystem 102 or the I/O device 106A. In an exemplary embodiment of the present invention, the computation unit 118 provides selection of industry standard values of respective predefined parameters from a parameter setup table maintained in the template database 122.

In an embodiment of the present invention, the user-customizable parameters include, but are not limited to, data type of the sub-segment, usage indicating if the sub-segment is mandatory or optional, minimum size, maximum size, duplicability, identical-ability, specific format pattern, influenced, preset data value. In an embodiment of the present invention, the datatype comprises a list of auto-generated datatype fields and realistic datatype fields. In an embodiment of the present invention, the auto generated datatype fields include, but are not limited to, alpha numeric, date, alphabet, and numeric. In an embodiment of the present invention, the realistic datatype fields include, but are not limited to, address, name, Social Security Number (SSN), email, telephone number. In an embodiment of the present invention, the user-customizable parameter minimum size defines the minimum number of characters for the data value of the sub-segment. In an embodiment of the present invention, the parameter maximum size defines the maximum number of characters for the data value of the sub-segment.

The parameter duplicability defines if the data value associated with the sub-segment may be duplicated for other data records. The parameter identical-ability enables a sub-segment to mimic another selected sub-segment. The parameter specific format pattern defines a specific pattern for the sub-segment structure. The parameter influenced enables the linking of one sub-segment with other sub-segments. For example, where the selected operating field is healthcare insurance, one or more sub-segments of a member segment may be influenced by one or more sub-segments of coverage detail segment such as Plan, Group, or Provider that further influences the enrollment process in the healthcare payer application. The parameter preset data value enables configuring of a set of values for the sub-segment. For E.g. where the selected operating field is healthcare insurance, the sub-segments, such as coverage plan or employee project code may have specific set values, which cannot be auto-generated. In an embodiment of the present invention, the computation unit 118 is configured to populate the one or more user-customizable parameters using user inputs received via the ALM subsystem 102 or the I/O device 106A. Subsequently, the computation unit 118 generates data values for each of the sub-segments based on the one or more predefined parameters and/or the user-customizable parameters. In accordance with various embodiments of the present invention, the computation unit 118 is configured to store the data structure and data values associated with sub-segments in the storage database 120.

In accordance with various embodiments of the present invention, the computation unit 118 is configured to evaluate most probable and optimized combinations between the one or more sub-segments of the one or more segments. In an embodiment of the present invention, the most probable and optimized combinations between the data values of one or more customizable sub-segments of the one or more predefined segments are evaluated. In an embodiment of the present invention, the one or more customizable sub-segments required for evaluating the combinations can be selected by a user. In accordance with various embodiments of the present invention, the most probable and optimized combinations between the data values of the one or more sub-segments of the one or more segments are evaluated using orthogonal array testing techniques. In operation, a Cartesian product of the data values of the one or more sub-segments of the one or more segments is derived. Further, the most probable and optimized combinations between the data values of the one or more sub-segments from the derived Cartesian product are evaluated using orthogonal array testing techniques. In an embodiment of the present invention, the evaluated number of combinations are representative of the number of data records. For example, where the selected operating field is healthcare insurance, and the selected sub-segments of the predefined segments are gender and marital status. The data value for sub-segments gender and marital status as populated based on one or more predefined parameters may be male or female, and single, divorced, married, respectively, then the evaluated number of combinations between the sub-segments gender and marital status will be six, and therefore the number of data records will be six.

In accordance with various embodiments of the present invention, the computation unit 118 is configured to generate synthetic test data comprising a plurality of data records associated with the entity based on the generated data structure and the evaluated combinations. In particular, the computation unit 118 is configured to generate a plurality of data records associated with the entity based on the one or more sub-segments in the data structure and the evaluated combinations between the one or more sub-segments of the one or more segments. In accordance with various embodiments of the present invention, the number of data records is equivalent to the evaluated number of combinations. In accordance with various embodiments of the present invention, each data record is populated with one or more customizable sub-segments. In an embodiment of the present invention, the one or more customizable sub-segments are arranged within the data records and populated with data values based on the one or more parameters associated with the sub-segments.

In accordance with various embodiments of the present invention, the sub-segments required within the data records are selected by a user via the interface unit 116. In an embodiment of the present invention, the generated data records may be customized based on record specific variables, such as date, gender, address, age, etc. In an example, where the data processing application is associated with healthcare insurance, the sub-segments required in the 834 format data records may be selected via the interface unit 116 and the records may be customized as per variables, such as effective enrollment date, geography of members, gender of the members and age band.

In accordance with various embodiments of the present invention, the computation unit 118 is configured to provide linking of one or more data records with other data records based on a selected relationship between the data records. In an embodiment of the present invention, the relationship may be selected via a drop down menu graphically represented via the interface unit 116 to a user. In an embodiment of the present invention, the computation unit 118 defines a Link ID based on the selected relationship for linking the one or more data records with other data records. In an example, where the selected operating field is healthcare insurance and the data records are associated with members, the computation unit 118 is configured to define dependent data records representative of dependents of respective members of the healthcare payer by linking one or more member data record with other member data records using a unique family Link ID generated based on the selected family relationship codes and/or an extended family relationship codes. In an exemplary embodiment of the present invention, the family relationship code may be selected from spouse and children. In an exemplary embodiment of the present invention, the extended family relationship code is selected from a group comprising, but not limited to, father, mother, grandfather, grandmother, aunty, uncle etc.

Advantageously, the system of the present invention affords a technical effect in the field of software development and testing by enabling real-time generation of voluminous synthetic data with positive and negative test data combinations, to further complete test cases and improve test-case coverage for testing data processing applications. The system of the present invention affords on-demand generation of versatile, scalable, and secure synthetic data agnostic to data processing applications, thereby improving the field of software development and testing. Further, the system of the present invention, affords generation of synthetic data comprising a plurality of data records associated with an entity, such as a member/patient for testing healthcare data processing applications in a significantly reduced time duration. Furthermore, the system of the present invention provides for generation of large volumes of realistic synthetic data records encompassing various attributes of the entity without using confidential data, such as Protected Health Information (PHI) in case of healthcare test data.

Figure 2:
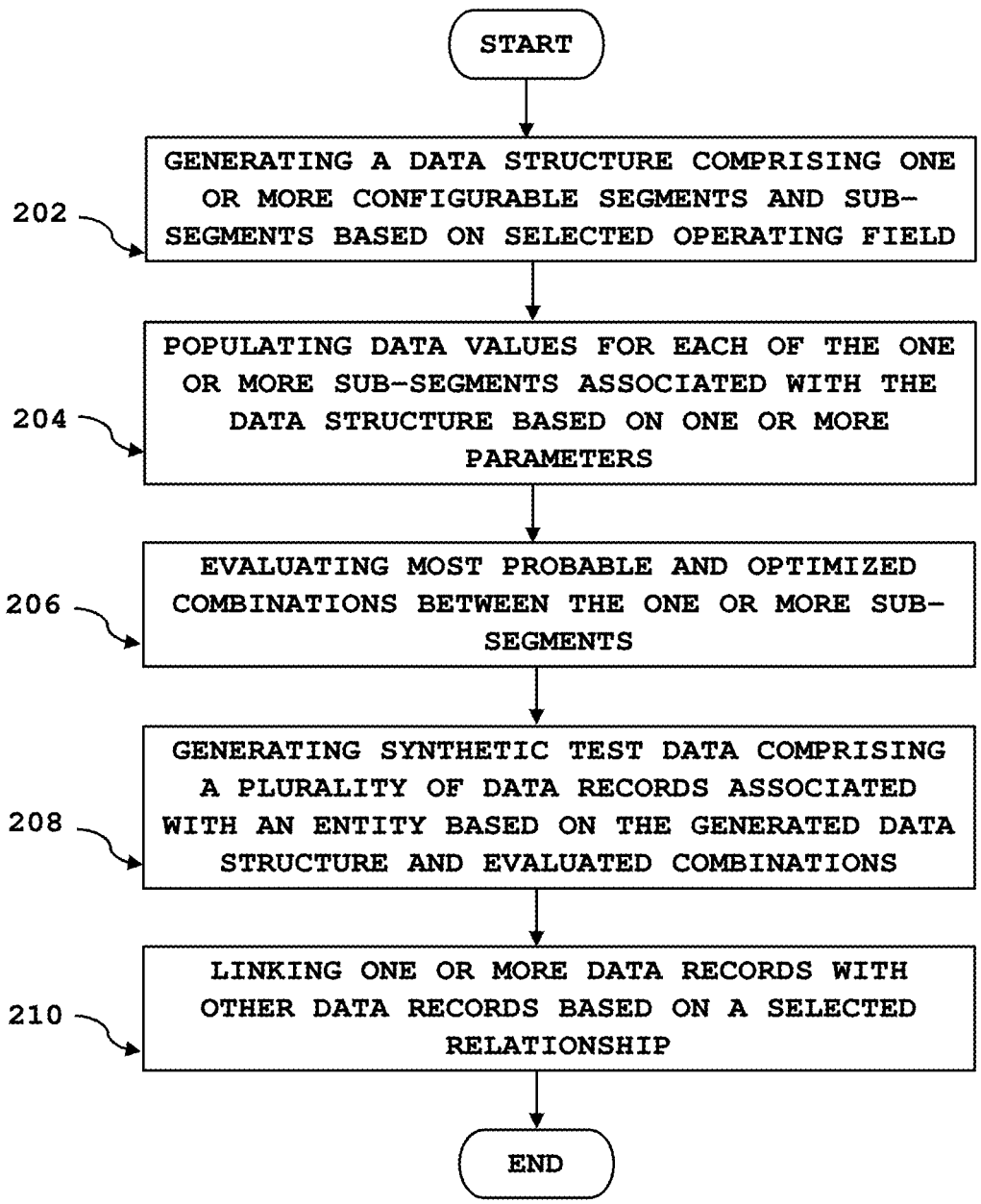
FIG. 2 is a flowchart illustrating a method for generating synthetic executable test data, in accordance with various embodiments of the present invention.

Referring to FIG. 2 a flowchart illustrating a method for generating synthetic executable test data is shown, in accordance with various embodiments of the present invention.

At step 202, a data structure comprising one or more configurable segments and sub-segments is generated based on an operating field. In an embodiment of the present invention, the operating field is selected based on the data processing application which is to be tested. In an embodiment of the present invention, the operating field is retrieved from a test data generation request. In an embodiment of the present invention the test data generation request may be received from an ALM subsystem (102 of FIG. 1) or any client-computing device. In an embodiment of the present invention, the received test data generation request includes, at least the operating field of the data processing application and/or the operating field of the test data, a file type, and a practice area, also referred to as Line of Business (LOB) associated with the operating field. Examples of operating field include, but are not limited to, healthcare insurance, banking, consumer data analytics, and employee management etc. Examples of file type may include, but are not limited to 834. In an exemplary embodiment of the present invention, the Line of Business (LOB) may be selected from, but is not limited to, Medicaid, Medicare, Dental, Vision, Commercial and Behavioral Health. In an exemplary embodiment of the present invention, the selected operating field is healthcare insurance. In an embodiment of the present invention, the data structure is a tree data structure.

In an embodiment of the present invention, data structure is populated with one or more predefined configurable segments based on the selected operating field. Each of the one or more segments of the data structure comprise one or more customizable sub-segments selected based on the practice area also referred to as Line of Business (LOB) associated with the operating field. In an embodiment of the present invention, the one or more predefined segments are representative of test data fields required in data records associated with an entity for the selected operating field. In embodiment of the present invention, the one or more sub-segments are representative of attributes of the corresponding segments. In an embodiment of the present invention, a predetermined repetition value representative of the number of times a segment and associated customizable sub-segments are required in a data record is defined for each of the segments. In an embodiment of the present invention, the one or more predefined configurable segments and associated sub-segments may be modified and deleted. In an embodiment of the present invention, new segments and associated sub-segments may be added. In an embodiment of the present invention, the modification and addition/deletion of the segments and associated sub-segments is defined as per the user requirement.

In operation, the one or more predefined segments are populated based on the selected operating field using a mapping table comprising one or more predefined segments mapped with respective operating fields. In an exemplary embodiment of the present invention, the mapping table is accessed from a template database (122 of FIG. 1). In another embodiment of the present invention, the one or more predefined segments are populated based on the operating field using machine learning or data analytics information associated with pre-generated data records of the operating field. In an exemplary embodiment of the present invention, where the selected operating field is healthcare insurance, the requested test data is representative of a plurality of data records associated with the entity, such as a member of the healthcare payer/insurer, and the one or more predefined configurable segments include, but are not limited to, member details specific to a healthcare Payer/Insurer, demographic details of the member, and the coverage details of the member.

In an exemplary embodiment of the present invention, where the selected operating field is healthcare insurance, the member detail segment comprises sub-segments specific to a payer, including, but not limited to, subscriber identifier, policy number, supplemental identifier, member level dates etc. The demographic segment comprises sub-segments including, but not limited to, member name, Date of Birth (DOB), Gender, address, language, responsible person details, employer, school, custodial parent etc. The coverage detail segment comprises sub-segment attributing health insurance arrangement, such as, but not limited to, Health coverage, plan, disability information, cost, provider information, Coordination of Benefits (COB) and details of the care for a member.

In accordance with various embodiments of the present invention, a graphical representation of the generated data structure along with the segments and sub-segments is generated. A graphical representation of tree data structure comprising segments and sub-segments associated with healthcare insurance are shown in FIG. 1A. As shown, in FIG. 1A, the graphical representation comprises a folder for practice area\LOB "commercial" further partitioned into sub-folder representative of segments "Member Level", "Demographic Level" and "Coverage Details". Each of the segments sub-folders are further segmented into sub-segments.

At step 204, data values for each of the one or more sub-segments associated with the data structure are populated based on one or more parameters. In an embodiment of the present invention, the one or more parameters define characteristics of respective sub-segments for representation on a data record. In accordance with various embodiments of the present invention, the one or more parameters are selected from predefined parameters or user-customizable parameters or a combination thereof.

In an embodiment of the present invention, the predefined parameters include, but are not limited to, Position of the Sub-Segment (POS), sub-segment ID, name of the sub-segment, usage, repetition, max repetition, syntax, ID, and loop. The parameter Position of Sub-Segment (POS) is representative of position of the sub-segment within a selected file format of the data record, such as 834. The parameter sub-segment ID is indicative of an identifier of the sub-segment. The parameter usage defines if the sub-segment is required or situational, where required is indicative of a mandatory sub-segment and situational is indicative of an optional sub-segment. The parameter repetition defines the number of times the sub-segment may be repeated. The parameter max repetition is indicative of the maximum number of repetitions allowed for the sub-segment. The parameter syntax defines the representation format of the sub-segment. For instance, for a sub-segment "address" the syntax may include codes for representing address in the form (Address Lines, City, Country, Zipcode, and State). In another example, a sub-segment "member date of birth" may be allocated a syntax dd\mm\yy or mm\dd\yy etc. In an exemplary embodiment of the present invention, the parameter loop defines the number of times a segment and its associated sub-segments may be repeated.

In an embodiment of the present invention, the one or more predefined parameters are selected based on user selection from a list of predefined parameters via the ALM subsystem 102 or the I/O device 106A. Subsequently, the values of the one or more predefined parameters are populated based on user selection via the ALM subsystem 102 or the I/O device 106A. In an exemplary embodiment of the present invention, the computation unit 118 provides selection of industry standard values of respective predefined parameters from a parameter setup table maintained in a template database.

In an embodiment of the present invention, the user-customizable parameters include, but are not limited to, datatype of the sub-segment, usage indicating if the sub-segment is mandatory or optional, minimum size, maximum size, duplicability, identical-ability, specific format pattern, influenced, and preset data value. In an embodiment of the present invention, the datatype comprises a list of auto-generated datatype fields and realistic datatype fields. In an embodiment of the present invention, the auto generated datatype fields include, but are not limited to, alpha numeric, date, alphabet, and numeric. In an embodiment of the present invention, the realistic datatype fields include, but are not limited to, address, name, Social Security Number (SSN), email, telephone number. In an embodiment of the present invention, the user-customizable parameter minimum size defines the minimum number of characters for the data value of the sub-segment. In an embodiment of the present invention, the parameter maximum size defines the maximum number of characters for the data value of the sub-segment. The parameter duplicability defines if the data value associated with the sub-segment may be duplicated for other data records. The parameter identical-ability enables a sub-segment to mimic another selected sub-segment. The parameter specific format pattern defines a specific pattern for the sub-segment structure. The parameter influenced enables the linking of one sub-segment with other sub-segments. For e.g.—where the selected operating field is healthcare insurance, one or more sub-segments of a member segment may be influenced by one or more sub-segments of coverage detail segment such as Plan, Group, or Provider that further influences the enrollment process in the healthcare payer application. The parameter preset data value enables configuring of a set of values for the sub-segment. For E.g. where the selected operating field is healthcare insurance, the sub-segments, such as coverage plan or employee project code may have specific set values, which cannot be auto-generated. In an embodiment of the present invention, the one or more user-customizable parameters are populated using user inputs received via the ALM subsystem 102 or an I/O device.

At step 206, most probable and optimized combinations between the one or more customizable sub-segments of the one or more predefined segments are evaluated. In an embodiment of the present invention, most probable and optimized combinations between the data values of one or more customizable sub-segments of the one or more predefined segments are evaluated. In an embodiment of the present invention, the one or more customizable sub-segments required for evaluating the combinations can be selected by a user. In accordance with various embodiments of the present invention, the most probable and optimized combinations between the data values of the one or more sub-segments of the one or more segments are evaluated using orthogonal array testing techniques. In operation, a Cartesian product of the data values of the one or more sub-segments of the one or more segments is derived. Further, the most probable and optimized combinations between the data values of the one or more sub-segments from the derived Cartesian product are evaluated using orthogonal array testing techniques. In an embodiment of the present invention, the evaluated number of combinations are representative of the number of data records. For example: where the selected operating field is healthcare insurance, and the sub-segments of the predefined segments are gender and marital status. The data value for sub-segments gender and marital status as populated based on one or more predefined parameters may be male or female, and single, divorced, married, respectively, then the evaluated number of combinations between the sub-segments gender and marital status will be six, and therefore the number of data records will be six.

At step 208, synthetic test data comprising a plurality of data records associated with an entity is generated based on the generated data structure and the evaluated combinations. In an embodiment of the present invention, a plurality of data records associated with the entity are generated based on the one or more sub-segments of the data structure and the evaluated combinations between the one or more sub-segments of the one or more segments. In accordance with various embodiments of the present invention, the number of data records is equivalent to the evaluated number of combinations. In accordance with various embodiments of the present invention, each data record is populated with one or more customizable sub-segments. In accordance with various embodiments of the present invention, the one or more sub-segments required within the data records may be selected by a user.

In an embodiment of the present invention, the selected sub-segments are arranged within the data records and populated with data values based on the one or more parameters associated with the selected sub-segments. As already described above, the one or more parameters are selected from one or more predefined parameters or the user-customizable parameters or a combination thereof. The one or more parameters define characteristics of respective sub-segments, such as position, usage, repetition, max repetition, syntax based on which the data values of the respective sub-segments are generated.

In an embodiment of the present invention, the generated data records may be customized based on record specific variables, such as date, gender, address, age etc. In an example, where the selected operating field is healthcare insurance, the sub-segments required in the 834 format data records may be selected and the records may be customized as per record specific variables, such as effective enrollment date, geography of members, gender of the members and age band.

At step 210, one or more data records are linked with other data records based on a selected relationship between the data records. In an embodiment of the present invention, the relationship may be selected via a drop down menu graphically represented to a user on I/O device or ALM subsystem. In an embodiment of the present invention, a Link ID is defined based on the selected relationship for linking the one or more data records with other data records. In an example, where the selected operating field is healthcare insurance and the data records are associated with members, the dependent data records representative of dependents of respective members of the healthcare payer are defined by linking one or more member data records with other member data records using a unique family Link ID generated based on the selected family relationship codes and/or an extended family relationship codes. In an exemplary embodiment of the present invention, the family relationship code may be selected from spouse and children. In an exemplary embodiment of the present invention, the extended family relationship code is selected from a group comprising, but are not limited to, father, mother, grandfather, grandmother, aunty, uncle etc.

Advantageously, the method of the present invention affords a technical effect in the field of software development and testing by enabling real-time generation of voluminous synthetic data with positive and negative test data combinations, to further complete test cases and improve test-case coverage for testing data processing applications. The method of the present invention further affords on-demand generation of versatile, scalable, and secure synthetic data agnostic to data processing applications, thereby improving the field of software development and testing. Further, the method of the present invention, affords generation of synthetic data comprising a plurality of data records associated with an entity, such as a member/patient for testing healthcare data processing applications in a significantly reduced time duration. Furthermore, the method of the present invention provides for generation of large volumes of realistic synthetic data records encompassing various attributes of the entity without using confidential data, such as Protected Health Information (PHI) in case of healthcare test data.

Figure 3:
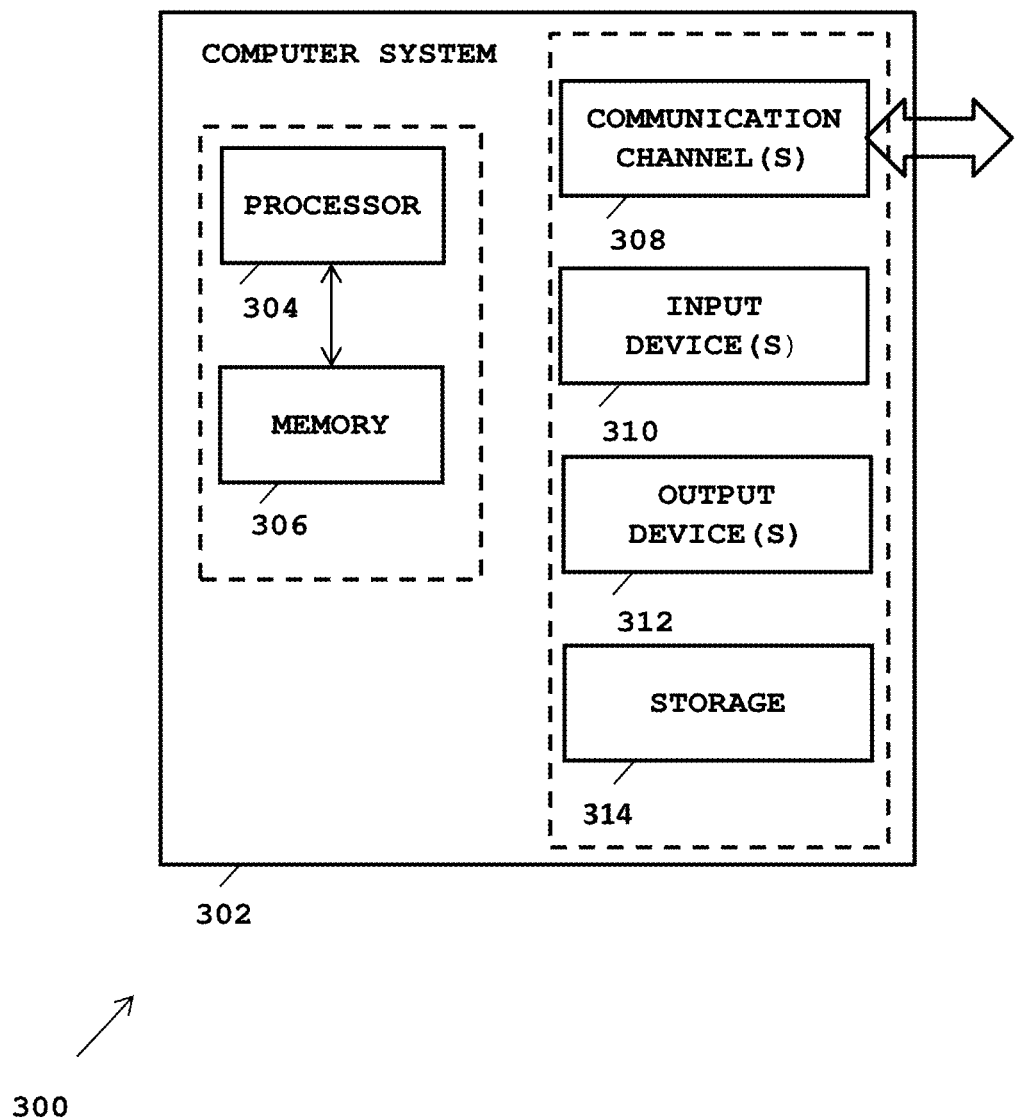
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but is not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel (s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for automatically generating synthetic test data for testing healthcare data processing applications, wherein the method is implemented by a processor executing program instructions stored in a memory, the method comprising:

generating, by the processor, a data structure associated the data processing application, wherein the data structure is a tree structure populated with one or more predefined configurable segments based on a selected operating field of the data processing application, each of the one or more predefined segments further comprising one or more customizable sub-segments, wherein the predefined configurable segments are representative of test data fields required in data records associated with an entity for the selected operating field, and wherein the customizable sub-segments are representative of attributes of the corresponding predefined configurable segments selected based on a practice area associated with the selected operating field;

evaluating, by the processor, most probable and optimized combinations between data values of the customizable sub-segments; and generating, by the processor, synthetic test data in real-time comprising a plurality of data records based on the generated data structure and the evaluated combinations of the data values of the customizable sub-segments without using confidential protected health information data, wherein a number of the plurality of data records is equivalent to the evaluated number of combinations of the customizable sub-segments which are arranged within each of the plurality of data records and populated with the data values based on one or more parameters that define characteristics of the customizable sub-segments, and wherein dependent data records of the plurality of data records which are representative of dependents of members of the entity are defined by linking one or more member data records with other member data records of the plurality of data records using a unique family link ID.

2. The method as claimed in claim 1, wherein the selected operating field is healthcare insurance, and wherein the plurality of data records are associated with respective members of a healthcare payer.

3. The method as claimed in claim 1, wherein the practice area is selected from Medicaid, Medicare, Dental, Vision, Commercial and Behavioral Health.

4. The method as claimed in claim 1, wherein a predetermined repetition value representative of number of times a predefined configurable segment and associated customizable sub-segments are required in each of the plurality of data records is defined for each of the predefined configurable segments as per user requirement.

5. The method as claimed in claim 1, wherein the generated data structure populated with the one or more predefined configurable segments and the one or more customizable sub-segments is graphically represented for modification, deletion and addition of new segments and sub-segments as per user requirement.

6. The method as claimed in claim 1, wherein the one or more predefined configurable segments are populated based on the selected operating field using a mapping table comprising the one or more predefined configurable segments mapped with respective operating fields; or
the one or more predefined configurable segments are populated based on the selected operating field using machine learning or data analytics information associated with pre-generated data records of the selected operating field.

7. The method as claimed in claim 2, wherein the one or more predefined configurable segments are selected from a group comprising member details specific to a healthcare payer, demographic details of the member, the coverage details of the member or a combination thereof.

8. The method as claimed in claim 7, wherein the member detail segment comprises sub-segments specific to a payer, including subscriber identifier, policy number, supplemental identifier, and member level dates;
the demographic segment comprises sub-segments including member name, Date of Birth (DOB), Gender, address, language, responsible person details, employer, school, and custodial parent; and
the coverage detail segment comprises sub-segment attributing health insurance arrangement, including Health coverage, plan, disability information, cost, provider information, Coordination of Benefits (COB) and details of the care for a member.

9. The method as claimed in claim 1, wherein the step of evaluating the most probable and optimized combinations between the one or more customizable sub-segments of the one or more predefined configurable segments comprises:
deriving a Cartesian product of the data values of selected customizable sub-segments; and
evaluating the most probable and optimized combinations between the data values of the one or more sub-segments from the derived Cartesian product using orthogonal array testing techniques.

10. The method as claimed in claim 1, wherein the one or more parameters are selected from predefined parameters or user-customizable parameters or a combination thereof, further wherein the values of the one or more predefined parameters and the user-customizable parameters is populated based on user inputs.

11. The method as claimed in claim 10, wherein the predefined parameters comprise Position of Sub-Segment (POS), sub-segment ID, name of the sub-segment, usage, repetition, max repetition, syntax, ID, and loop, wherein the parameter Position of Sub-Segment (POS) is representative of position of a sub-segment within a selected file format of the data record, the parameter sub-segment ID is indicative of an identifier of a sub-segment, the parameter usage defines if a sub-segment is required or situational, the parameter repetition defines the number of times a sub-segment may be repeated, the parameter max repetition is indicative of maximum number of repetitions allowed for a sub-segment, the parameter syntax defines the representation format of a sub-segment, and the parameter loop defines the number of times a segment and its associated sub-segments may be repeated.

12. The method as claimed in claim 10, wherein the user-customizable parameters comprise datatype of a sub-segment, usage indicating if a sub-segment is mandatory or optional, minimum size, maximum size, duplicability, identical-ability, specific format pattern, influenced, and preset data value, further wherein, the datatype comprises a list of auto-generated datatype fields and the realistic datatype fields, the user-customizable parameter minimum size defines the minimum number of characters for data value of a sub-segment, the parameter maximum size defines the maximum number of characters for data value of a sub-segment, the parameter duplicability defines if data value associated with a sub-segment may be duplicated for other data records, the parameter identical-ability enables a sub-segment to mimic another selected sub-segment, the parameter specific format pattern defines a specific pattern for a sub-segment structure, the parameter influenced enables linking of a sub-segment with other sub-segments and the parameter preset data value enables configuring of a set of values for a sub-segment.

13. The method as claimed in claim 2, wherein the plurality of data records are customized based on record specific variables including date, gender, address, and age.

14. The method as claimed in claim 2, wherein the unique family Link ID is generated based on a selection of family relationship code or an extended family relationship code or a combination thereof, and wherein the family relationship code is selected from spouse and children, and the extended family relationship code is selected from a group comprising father, mother, grandfather, grandmother, aunty, and uncle.

15. A system for automatically generating synthetic test data for testing healthcare data processing applications, the system comprising:
a memory storing program instructions; a processor configured to execute program instructions stored in the memory; and a synthetic data generation engine executed by the processor, and configured to:

generate a data structure associated the data processing application, wherein the data structure a tree structure populated with one or more predefined segments based on a selected operating field of the data processing application, each of the one or more predefined segments further comprises one or more customizable sub-segments, wherein the predefined configurable segments are representative of test data fields required in data records associated with an entity for the selected operating field, and wherein the customizable sub-segments are representative of attributes of the corresponding predefined configurable segments selected based on a practice area associated with the selected operating field;

evaluate most probable and optimized combinations between data values of the customizable sub-segments; and generate synthetic test data in real-time comprising a plurality of data records based on the generated data structure and the evaluated combinations of the data values of the customizable sub-segments without using confidential protected health information data, wherein a number of the plurality of data records is equivalent to the evaluated number of combinations of the customizable sub-segments which are arranged within each of the plurality of data records and populated with the data values based on one or more parameters that define characteristics of the customizable sub-segments, and wherein dependent data records which are representative of dependents of members of the entity are defined by linking one or more member data records with other member data records of the plurality of data records using a unique family link ID using a unique family link ID.

16. The system as claimed in claim 15, wherein the selected operating field is healthcare insurance, and the plurality of data records are associated with respective members of a healthcare payer.

17. The system as claimed in claim 16, wherein the practice area is selected from Medicaid, Medicare, Dental, Vision, Commercial and Behavioral Health.

18. The system as claimed in claim 15, wherein a predetermined repetition value representative of number of times a predefined segment and associated customizable sub-segments are required in each of the plurality of data records is defined for each of the segments as per user requirement.

19. The system as claimed in claim 15, wherein the generated data structure populated with the one or more predefined segments and the one or more customizable sub-segments is graphically represented for modification, deletion and addition of new segments and sub-segments as per user requirement.

20. The system as claimed in claim 16, wherein the one or more predefined configurable segments are selected from a group comprising member details specific to a healthcare payer, demographic details of the member, the coverage details of the member or a combination thereof.

21. The system as claimed in claim 20, wherein the member detail segment comprises sub-segments specific to a payer, including subscriber identifier, policy number, supplemental identifier, and member level dates;

the demographic segment comprises sub-segments including member name, Date of Birth (DOB), Gender, address, language, responsible person details, employer, school, and custodial parent; and the coverage detail segment comprises sub-segment attributing health insurance arrangement, including Health coverage, plan, disability information, cost, provider information, Coordination of Benefits (COB) and details of the care for a member.

22. The system as claimed in claim 15, wherein evaluating most probable and optimized combinations between the one or more customizable sub-segments of the one or more predefined segments comprises:

deriving a Cartesian product of the data values of the selected one or more customizable sub-segments; and evaluating the most probable and optimized combinations between the data values of the one or more sub-segments from the derived Cartesian product using orthogonal array testing techniques.

23. The system as claimed in claim 15, wherein the one or more parameters are selected from predefined parameters or user-customizable parameters or a combination thereof, further wherein the values of the one or more predefined parameters and the user-customizable parameters is populated based on user inputs.

24. The system as claimed in claim 23, wherein the predefined parameters comprise Position of Sub-Segment (POS) representative of position of a sub-segment within a selected file format of the data record, sub-segment ID, name of the sub-segment, usage, repetition, max repetition, syntax, ID, and loop.

25. The system as claimed in claim 23, wherein the user-customizable parameters comprise datatype of a sub-segment, usage indicating if a sub-segment is mandatory or optional, minimum size, maximum size, duplicability, identical-ability, specific format pattern, influenced, and preset data value, further wherein, the datatype comprises a list of auto-generated datatype fields and the realistic datatype fields, the user-customizable parameter minimum size defines the minimum number of characters for data value of a sub-segment, the parameter maximum size defines the maximum number of characters for data value of a sub-segment, the parameter duplicability defines if data value associated with a sub-segment may be duplicated for other data records, the parameter identical-ability enables a sub-segment to mimic another selected sub-segment, the parameter specific format pattern defines a specific pattern for a sub-segment structure, the parameter influenced enables linking of a sub-segment with other sub-segments, and the parameter preset data value enables configuring of a set of values for a sub-segment.

26. The system as claimed in claim 16, wherein the plurality of data records are customized based on record specific variables including date, gender, address, and age.

27. The system as claimed in claim 16, wherein, the family Link ID is generated based on a selection of family relationship code or an extended family relationship code or a combination thereof, and wherein the family relationship code is selected from spouse and children, and the extended family relationship code is selected from a group comprising father, mother, grandfather, grandmother, aunty, and uncle.

28. A computer program product comprising:

a non-transitory computer-readable medium having computer-readable program code stored thereon, the computer-readable program code comprising instructions that, when executed by a processor, cause the processor to:

generate a data structure associated the data processing application, wherein the data structure is a tree structure populated with one or more predefined configurable segments based on a selected operating field of the data processing application, each of the one or more predefined segments further comprises one or more customizable sub-segments, wherein the predefined configurable segments are representative of test data fields required in data records associated with an entity for the selected operating field, and wherein the customizable sub-segments are representative of attributes of the corresponding predefined configurable segments selected based on a practice area associated with the selected operating field;

evaluate most probable and optimized combinations between data values of the customizable sub-segments; and generate synthetic test data in real-time comprising a plurality of data records based on the generated data structure and the evaluated combinations of the data values of the customizable sub-segments without using confidential protected health information data, wherein a number of the plurality of data records is equivalent to the evaluated number of combinations of the customizable sub-segments which are arranged within each of the plurality of data records and populated with the data values based on one or more parameters that define characteristics of the customizable sub-segments, and wherein dependent data records of the plurality of data records which are representative of dependents of members of the entity are defined by linking one or more member data records with other member data records using a unique family Link ID.

* * * * *